United States Patent

Sosin

[15] 3,701,038

[45] Oct. 24, 1972

[54] PARALLEL AMPLIFIERS WITH INPUT AND OUTPUT SEQUENCES OF HYBRIDS

[72] Inventor: Boleslaw Marina Sosin, Chelmsford, England

[73] Assignee: The Marconi Company, London, England

[22] Filed: Dec. 14, 1970

[21] Appl. No.: 97,953

[30] Foreign Application Priority Data

Dec. 19, 1969 Great Britain..........62,152/69

[52] U.S. Cl.................330/124 R, 330/149, 330/151

[51] Int. Cl.................................................H03f 3/68

[58] Field of Search......330/30 R, 124, 53, 149, 151; 333/11

[56] References Cited

UNITED STATES PATENTS

| | | | |
|---|---|---|---|
| 3,571,739 | 3/1971 | Seidel | 330/30 R |
| 3,444,475 | 5/1969 | Seidel | 330/124 R |

*Primary Examiner*—Roy Lake
*Assistant Examiner*—James B. Mullins
*Attorney*—Baldwin, Wight & Brown

[57] ABSTRACT

An amplifier arrangement for operating at least 3 amplifiers in parallel includes a first and second sequence of hybrids, there being one less hybrid in each sequence than there are amplifiers. The first sequence of hybrids have one output connected to an amplifier and the other output connected to the input of the following hybrid, except the last hybrid in the sequence which has its other output connected to the last amplifier input. The second sequence of hybrids have two inputs, one from an associated amplifier and another from the preceding hybrid, except the first hybrid in the second sequence which has both inputs supplied from amplifiers.

5 Claims, 2 Drawing Figures

PATENTED OCT 24 1972 3,701,038

INVENTOR
Boleslaw Marian Sosen
BY
Baldwin Wight & Brown
ATTORNEYS

PARALLEL AMPLIFIERS WITH INPUT AND OUTPUT SEQUENCES OF HYBRIDS

This invention relates to amplifier arrangements of the kind comprising a plurality of amplifiers for operation in parallel and has for itsobject to provide improved low noise arrangements of this kind.

According to this invention an amplifier arrangement comprises a plurality of at least three amplifiers provided to operate in parallel, a chain of hybrid units connected serially with an input terminal of a following hybrid unit connected to the first output terminal of the preceding hybrid unit, an input terminal of the first hybrid unit in the chain being connected to receive signals to be amplified, and the second output terminal of all of the hybrid units and the first output terminal of the last hybrid unit in the chain being connected to the input terminal of a different one of said plurality of amplifiers.

According to one feature of this invention an amplifier arrangement comprises a plurality of amplifiers provided to operate in parallel; two sequences of hybrids each consisting of a number of hybrids one less than the number of amplifiers; means for applying signals to be amplified to an input terminal of the first hybrid in one sequence; means for taking amplified output signals from an output terminal of the last hybrid in the other sequence; means for feeding outputs from the hybrids in said one sequence to said amplifiers, the last hybrid in said one sequence providing outputs to two amplifiers and the remaining hybrids in said one sequence feeding each into a different one of the remaining amplifiers; and means for feeding outputs from the amplifiers to the hybrids in said other sequence, the first hybrid in said other sequence receiving two inputs each from a different one of two amplifiers and each of the other hybrids in said other sequence receiving from a different one of the other amplifiers.

According to another feature of this invention an amplifier arrangement comprises a plurality of amplifiers provided to operate in parallel a first sequence of hybrids each, except the first, having an input terminal connected to a first output terminal of the immediately preceding hybrid and said first hybrid having its input terminal connected to receive input signals to be amplified; a second sequence of hybrids each of which, except the last, has an output terminal connected to an input terminal of the immediately following hybrid, and said last hybrid having an output terminal connected to a signal output terminal of the whole arrangement; and a plurality of amplifiers of which two have their input terminals connected one to one and the other to the other of the two output terminals of the last hybrid in the first sequence, the remaining amplifiers having their input terminals connected each to a different one of the second output terminals of the remaining hybrids in said first sequence, the amplifier fed with inputs from the first two hybrids in the first sequence having their output terminals connected one to one and the other to the other of two input terminals of the first hybrid in the second chain and the output terminal of each of the remaining amplifiers being connected to a second input terminal of a different one of the hybrids in the second sequence.

Preferably each of the hybrids is an asymmetric hybrid whereby, by adjusting the proportions in which power is passed through the different input/output channels of the hybrid, overall noise can be reduced to a minimum.

In practice, where more than twenty amplifiers are to be operated in parallel, it is preferred to provide two arrangements in accordance with this invention and operate them in parallel.

The invention is illustrated in the accompanying drawings in which.

Figure 1:
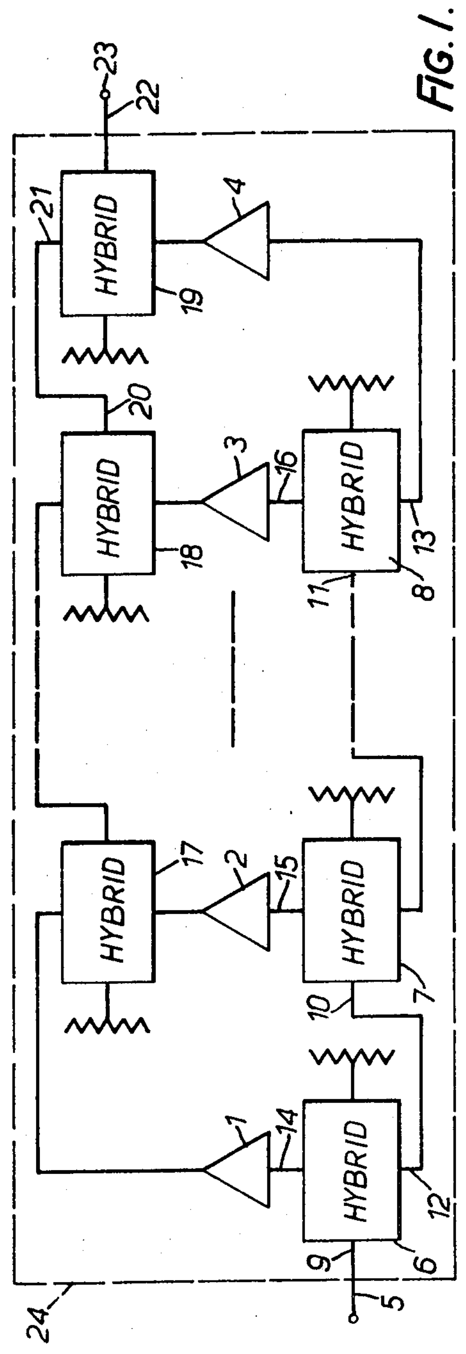
FIG. 1 is a block diagram of one embodiment of the invention.

Referring to FIG. 1 a plurality of amplifiers 1,2,3 and 4 are provided to operate in parallel to amplify input signals applied at an input terminal 5. Four amplifiers are shown but there may be any number, from three upwards to (in practice) about twenty, as may be required. Input signals appearing at terminal 5 are applied to the input terminals of amplifiers 1 to 4 via a first sequence of hybrid units 6, 7 and 8. The input terminal 9 of the first hybrid unit 6 in this sequence is connected to the input terminal 5 and the input terminal (such as 10 or 11) of each successive hybrid in the sequence is connected to a first output terminal of the immediately preceding hybrid unit. Thus input terminal 10 of hybrid 7 is connected to the first output terminal 12 of hybrid 6. The first output terminal 13 of the last hybrid 8 in the sequence is connected to the input of one, (4) of the amplifiers. The second output terminals (14, 15, 16) of the hybrids are connected individually to the input terminals of the remaining amplifiers (1, 2, 3).

Output signals amplified by the amplifiers 1, 2, 3 and 4 are applied to a second sequence of hybrid units 17, 18 and 19. Each of the hybrids, except the first, in the second sequence has an input terminal (e.g., 21 of hybrid 19) connected to the output terminal of the immediately preceding hybrid, the corresponding input of said first hybrid being connected to the output terminal of that amplifier (1) which is fed from the second output (14) of the first hybrid (6) in the first sequence. The output terminal 22 of the last hybrid 19 in the second sequence is connected to a final amplified signal output terminal 23. The remaining input terminals of the hybrids, except the last, are connected individually to the output terminals of the amplifiers whose inputs are provided from the second output terminals of the second and subsequent hybrids in the first sequence, the last hybrid in the second sequence having its corresponding remaining input terminal connected to the output terminal of that amplifier which is fed from the first output terminal of the last hybrid in the first sequence.

All the hybrids are preferably of the asymmetric type, that is to say of the type in which power through the different input/output channels of the hybrid can be set to required proportions. By suitably adjusting the proportions of power the overall noise of the amplifier arrangement, considered as a whole, may be reduced to an optimum low level approaching the value of noise obtained at the output of any one of the amplifiers.

Figure 2:
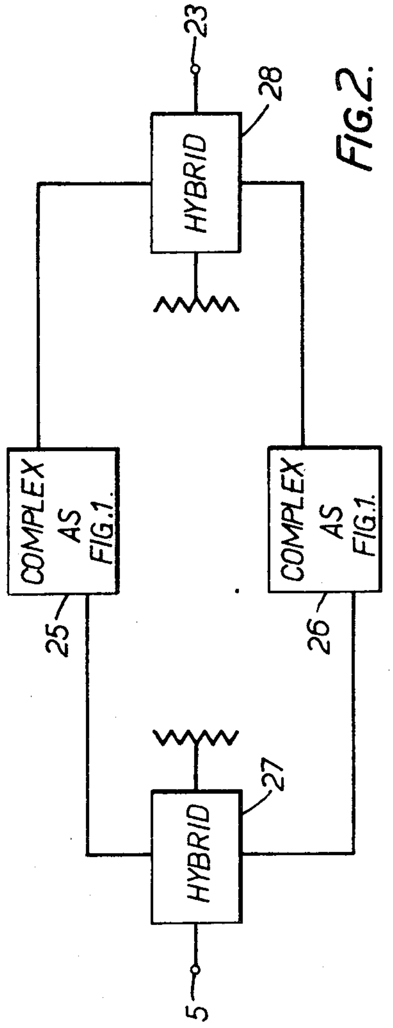
FIG. 2 is a simplified block diagram showing a modification.

In a large installation with more than twenty amplifiers, the arrangement of FIG. 2 is preferred. In this there are two amplifier arrangements, each as shown within the dashed line block 24 of FIG. 1, connected to operate in parallel. In FIG. 2 these are referenced 25 and 26 and labelled "complex as FIG. 1." Signals appearing at input terminal 5 are divided equally between 25 and 26 by a hybrid 27 and output signals from 25 and 26 are combined in a further hybrid unit 28 the output of which is fed to the final output terminal 23.

The hybrids may be any of a variety of suitable four-terminal hybrids as known *per se* and which are such that a signal applied to an input terminal will appear at two output terminals but not at the remaining terminal. They may be, for example, constructed as wound transformers or of sections of transmission lines or waveguides.

I claim:

1. An amplifier arrangement comprising a chain of hybrid units each, except the first, having an input terminal connected to a first output terminal of the preceding hybrid unit and said first hybrid unit in the chain having an input terminal connected to receive signals to be amplified, a plurality of amplifiers each having an input terminal and an output terminal, each hybrid unit also having a second output terminal, and the second output terminal of all the hybrid units and the first output terminal of the last hybrid unit in the chain being connected directly to the input terminal of a different one of said plurality of amplifiers.

2. An amplifier arrangement as claimed in claim 1 wherein said hybrids are of the asymmetric type whereby, by adjusting the proportions in which power is passed through the different input/output channels of the hybrids overall noise can be reduced to a minimum.

3. An amplifier arrangement comprising a first sequence of hybrids each, except the first, having an input terminal connected to a first output terminal of the immediately preceding hybrid and said first hybrid having its input terminal connected to receive input signals to be amplified; a second sequence of hybrids each of which, except the last, has an output terminal connected to an input terminal of the immediately following hybrid, and said last hybrid having an output terminal connected to a signal output terminal of the whole arrangement; and a plurality of amplifiers of which two have their input terminals connected one to one and the other to the other of the two output terminals of the last hybrid in the first sequence, the remaining amplifiers having their input terminals connected each to a different one of the second output terminals of the remaining hybrids in said first sequence, the amplifiers fed with inputs from the first two hybrids in the first sequence having their output terminals connected one to one and the other to the other of two input terminals of the first hybrid in the second chain and the output terminals of each of the remaining amplifiers being connected to a second input terminal of a different one of the hybrids in the second sequence.

4. In combination two amplifier arrangements as claimed in claim 3, means for applying input signals to be amplified to said arrangements via a first additional hybrid having two output terminals each connected to the signal input terminal of a different one of said two arrangements, and means for taking the amplified outputs from said arrangements via a second additional hybrid having two input terminals each connected to the signal output terminal of a different one of said two arrangements.

5. An amplifier arrangement as claim in claim 3 wherein said hybrids are of the asymmetric type whereby, by adjusting the proportions in which power is passed through the different input/output channels of the hybrids, overall noise can be reduced to a minimum.

* * * * *